United States Patent [19]
Hewitt

[11] Patent Number: 6,109,625
[45] Date of Patent: Aug. 29, 2000

[54] MOBILE BASE

[75] Inventor: Timothy W. Hewitt, Pleasant Ridge, Mich.

[73] Assignee: HTC Products, Inc., Royal Oak, Ill.

[21] Appl. No.: 09/268,491

[22] Filed: Mar. 11, 1999

Related U.S. Application Data

[60] Provisional application No. 60/077,840, Mar. 13, 1998.

[51] Int. Cl.[7] ..................................................... B62B 1/00
[52] U.S. Cl. ..................................... 280/43.24; 280/47.34; 280/79.11
[58] Field of Search ............................... 280/79.11, 79.2, 280/79.3, 47.34, 43, 43.17, 43.24; 16/32, 18 R; 188/5, 6, 7

[56] References Cited

U.S. PATENT DOCUMENTS

| | | | |
|---|---|---|---|
| 4,417,738 | 11/1983 | Kendall | 280/43.24 |
| 4,639,005 | 1/1987 | Birkley | 280/43.24 |
| 4,934,720 | 6/1990 | Dobron | 280/79.11 |
| 5,035,445 | 7/1991 | Poulin | 280/79.11 |
| 5,599,031 | 2/1997 | Hodges | 280/79.11 |
| 5,876,173 | 3/1999 | English, Jr. | 280/79.11 |

OTHER PUBLICATIONS

*Woods* Magazine, Dec. 1998.

*Primary Examiner*—Richard M. Camby
*Attorney, Agent, or Firm*—Howard & Howard

[57] ABSTRACT

A mobile base assembly for movably supporting machinery comprises stamped corner members, extension members, support wheel attachments, caster wheel assemblies, and at least two stops for supporting the machinery in a stationary position. The extension members and the corner members each have a plurality of holes. The holes in the extension members can be aligned with the holes in the corner member for receipt of bolts to fasten the extension member to the corner member. Further, each caster wheel assembly has a lifting mechanism that allows the mobile base assembly to be raised and lowered. The mobile base assembly is mobile in the raised position and stationary in the lowered position. In an alternative embodiment the support wheel attachments and caster wheel assemblies are attached directly to the machinery.

21 Claims, 7 Drawing Sheets

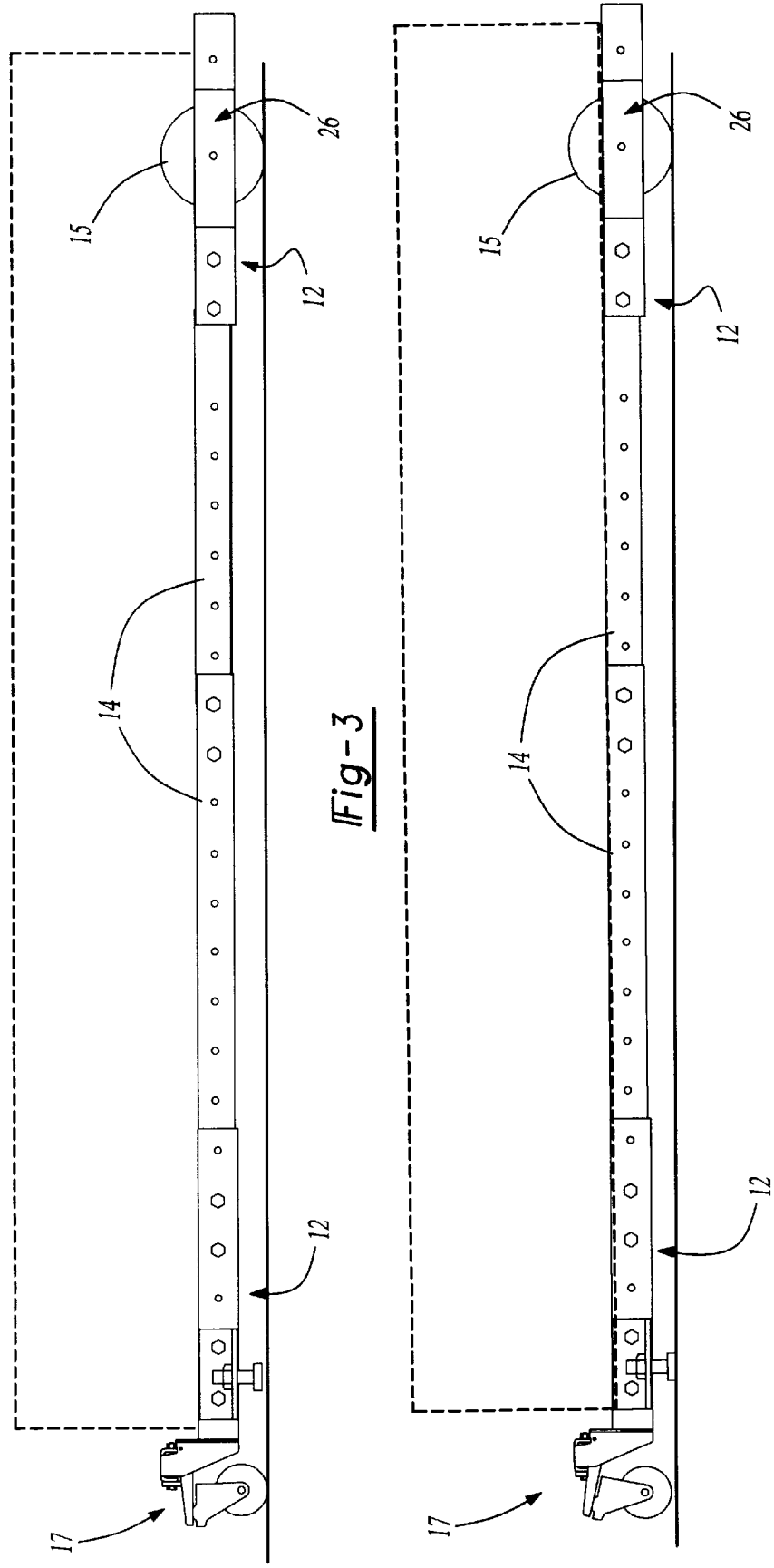

MOBILE BASE

This application claims the benefit of provisional patent application Ser. No. 60/077,840, filed Mar. 13, 1998.

BACKGROUND OF THE INVENTION

The present invention relates to a mobile base and more particularly to a sturdy, economical, adjustable mobile base.

Mobile bases are well known for supporting equipment, for example in a workshop, so that it can be easily moved from place to place within the workshop. A typical mobile base is custom made from metal which is welded together to form a base to fit a specific piece of equipment. The base has a support surface, which receives the bottom of the equipment and wheels to allow the equipment to be easily moved along a shop floor. A locking mechanism or supports are generally provided to hold the base in place once it has been moved to its desired position.

One disadvantage of custom-made mobile bases is the cost. They are designed for the specific tool to be supported, such as a table saw, and are then welded together and shipped to the customer. Their construction is labor intensive, particularly the time required to weld the various elements of the base together. A typical base will have four or more sides welded together at their corners. Further, corner brackets are welded inside of each corner and wheel brackets are welded to side members to receive the wheels. In addition to the labor cost, there are added shipping costs and packaging costs due to the mobile base being a welded unit that is more difficult to ship than one which is capable of being disassembled for shipping purposes.

Another disadvantage with a typical mobile base is that the base is not a do-it-yourself type product. The base requires a design to be established, the various side members and brackets are cut and then welded together to form a sturdy base which can support fairly heavy machinery in a shop environment.

A still further problem with traditional mobile bases is the inability to adjust the base for different types of machinery. Again, the typical mobile base is designed for a specific piece of machinery and can only be used with that specific piece of machinery. It typically cannot be interchanged with other machinery, which, for example, might be purchased to replace existing machinery within a shop environment. If new machinery is purchased, it is likely that it would need to have an entirely new base engineered and manufactured for it.

Attempts have been made to overcome these disadvantages. The applicant developed a universal mobile base known as the Port a Mate that can be adjusted between minimum and maximum sizes. For example, one unit can be adjusted from 12 inches by 17 inches to 25 inches by 30 inches. He has also developed other units that can be adjusted between different minimums and maximums. In this way, a group of bases have been developed which will accommodate machinery in groups of sizes so that a smaller number of bases can be used to support a greater amount of machine sizes.

This Port a Mate has corner members made of hollow square tubing welded to form a corner of about 90 degrees. Support plates are welded to the corner brackets for supporting the machinery. Wheel mounting brackets are also welded to three of the four corners. The sides of the base are formed by square tubing that is received within the corner tubing. The corner tubing has bolts that can be threaded into the corner tubing to engage the square tubing and hold it within the corner tubing. The corner tubing is open on both ends so that the square tubing can slide through the corner tubing to adjust the dimensions of the mobile base member between the minimums and maximums.

One difficulty with the mobile base is that it is still expensive to manufacture because the corner tubing has to be welded together, the wheel brackets have to be welded onto the corner brackets, and the corner support plates must be welded to the corner tubing. Further, the side members must be cut once the desired shape is determined so that the square side tubing is not extending out beyond the corner members.

Delta International Machinery Corporation has also attempted to solve the above problems by manufacturing a universal mobile base that can be assembled by do-it-yourselfers. The product includes corner brackets, wheels, a caster assembly, a foot pedal and assembly hardware. The base has four corner brackets that include corner support members and two of the corner members include caster wheels. Opposite the caster wheels is a caster wheel assembly that is mounted to a side member. The caster wheel assembly allows the side member opposite the caster wheels to be raised so that it can be moved around a shop floor. The caster wheel assembly includes a foot pedal that permits a user to press down on the foot pedal to raise the mobile base for moving. The side members of the Delta mobile base are made of wood and are received within the corner members and bolted in place.

A major problem with the universal mobile base is the use of the wood side rails. These rails must be sized, that is machined from a 2×4 to a 2×2, and cut to their desired length, holes drilled in them and bolts inserted to hold them in place. Although these tasks are well within the means of a typical do-it-yourselfer, it is time-consuming to construct the Delta mobile base. Further, because the rails are made of wood, there is a possibility of warping and rotting. Depending upon the environment in which the mobile base is used, the wood could warp and even over time rot requiring replacement so that the machinery can be properly supported upon the mobile base.

SUMMARY OF THE INVENTION

The mobile base of the present invention overcomes the above problem with known mobile bases. The mobile base of the present invention is easily assembled by the do-it-yourselfer. It has a strong, durable metal base, which is entirely assembled by bolting the various elements together. There is only a minor amount of welding required. Further, the mobile base is adjustable to numerous sizes to fit any number of different sizes of machinery. Further, the universal base of the present invention has an innovative, simple caster wheel assembly and position fixing mechanism to make movement and positioning of the mobile base and the supported machinery effortless. An alternative embodiment of the present invention is even further simplified because the caster wheel assembly is connected directly to the machinery.

DESCRIPTION OF THE DRAWINGS

FIG. 3 is a side view of the preferred embodiment of the mobile base assembly of the present invention with the caster wheel assembly in the lowered position.

FIG. 4 is a side view of the preferred embodiment of the mobile base assembly of the present invention with the caster wheel assembly in the raised position and the mobile base supported by the stop support members.

DETAILED DESCRIPTION OF THE INVENTION

Figure 1:
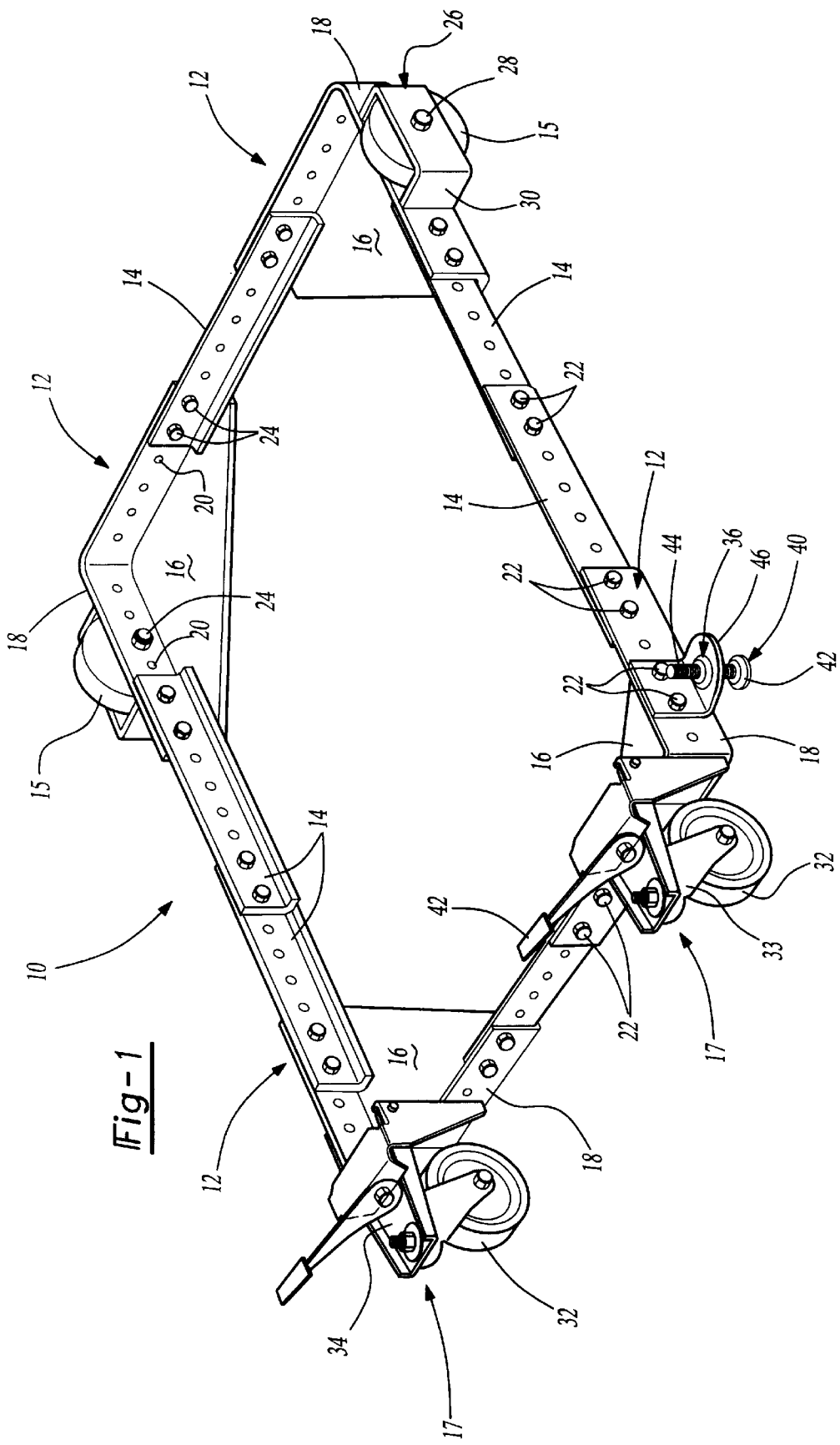
FIG. 1 is a perspective view of the preferred embodiment of the mobile base assembly of the present invention.
Figure 2:
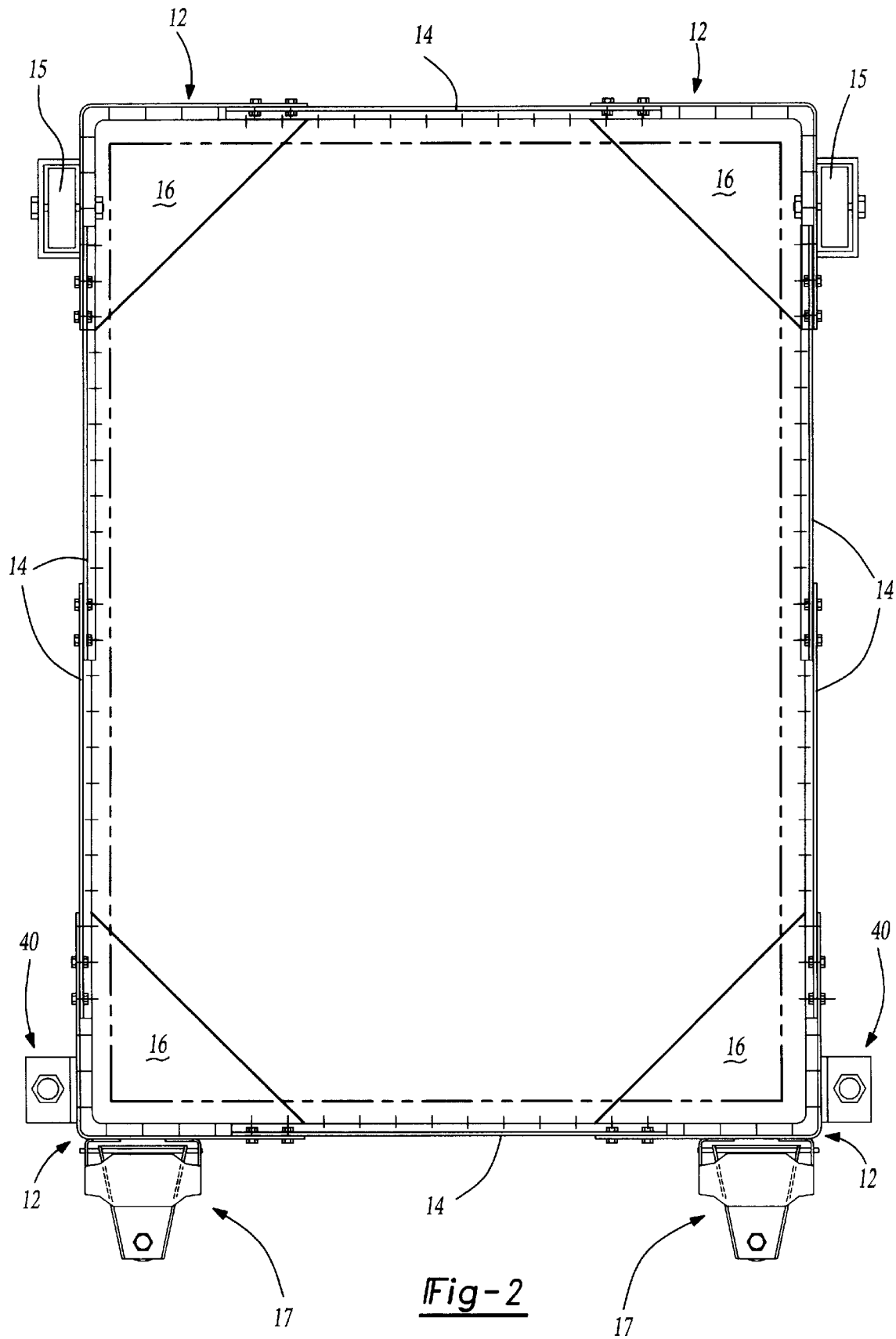
FIG. 2 is a top view of the preferred embodiment of the mobile base assembly of the present invention.
Figure 5:
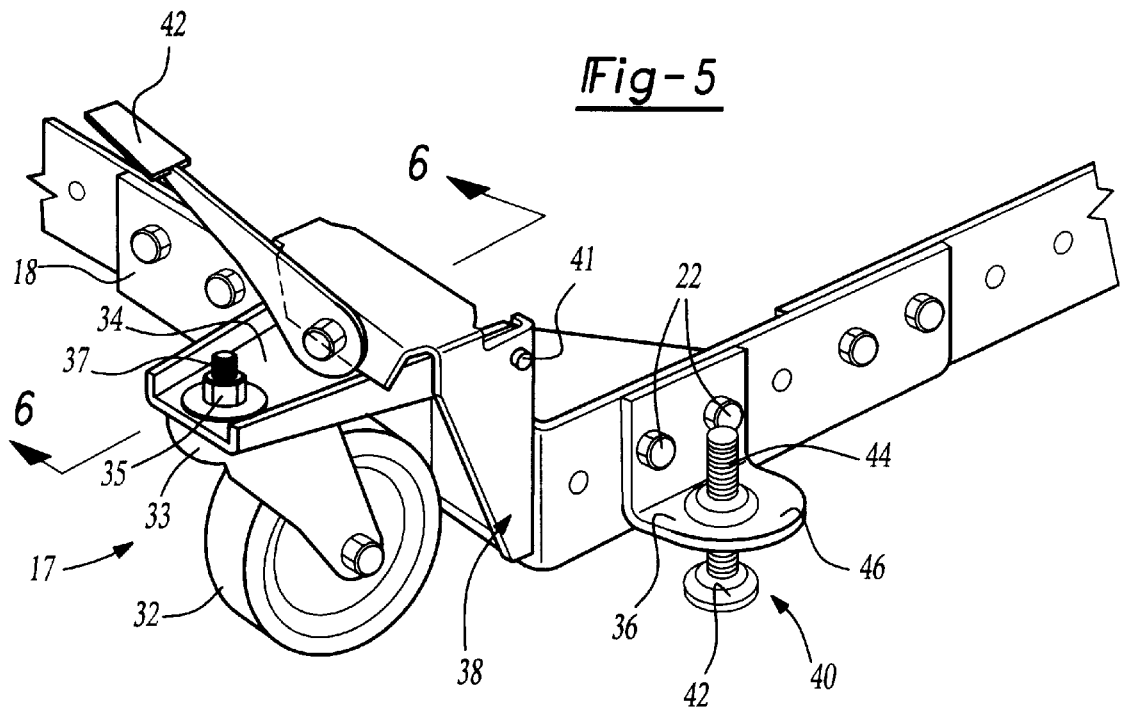
FIG. 5 is a partial perspective view of the preferred embodiment of the mobile base assembly of the present invention showing the caster wheel assembly and stop support assembly.

The mobile base of the present invention is shown generally at 10 in FIG. 1. In the preferred embodiment, the mobile base 10 includes four corner members 12, extension members 14, two support wheels attachment 26, two caster assemblies or pivotal wheel assemblies 17, and two stops 40 for supporting the base 10 when in the stationary position.

The corner members 12 are preferably manufactured by stamping the corner member 12 from sheet metal. The only welding that is done is a small bead of weld where the actual corners are formed. Each stamped corner member 12 includes a support plate 16 for supporting the machinery and for providing support at the corners of the mobile base 10 and side members 18. The side members 18 extend upwardly at a generally 90-degree angle to the support plate 16.

The extension members 14 and side members 18 have a plurality of openings for receipt of bolts 22 and nuts 24 to connect the extension members 14 to the side members 18. Extension members 14 are available in different lengths, however, the alignment of the holes is the same for all extension members 14 and side members 18. Therefore, one extension member 14 can be used to connect two corner members 12. Alternatively, two extension members 14 can be connected together and used to connect two corner members 12 together. This allows for flexibility in the size of the constructed mobile base assembly 10. Further, because of the plurality of holes in the extension members 14 and the side members 18, there is even greater flexibility in the distance between corner members 12 due to the overlapping nature of the extension members 14 and side members 18 of the corner members 12. This ease in alignment of the holes results in the ease in placement of bolts 22 and nuts 24 to connect the members together. As shown, the extension members 14 are angled to make them stiffer.

In the preferred embodiment, the support wheel attachments 26 each has a wheel 15 connected to the corner member 12 by an axle 28. In the disclosed embodiment, a bolt 28 forms the axle with a nut 24 on the opposite end to fix it in place. The wheel 15 freely rotates upon the bolt 28. Wheel skirts 30 are welded to the corner side members 18.

Figure 11:
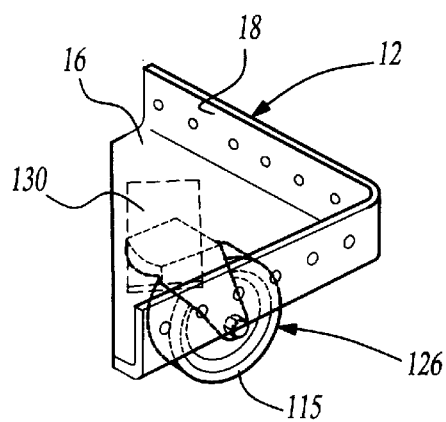
FIG. 11 is a partial perspective view of an alternative embodiment of the support wheel attachment assembly.
Figure 12:
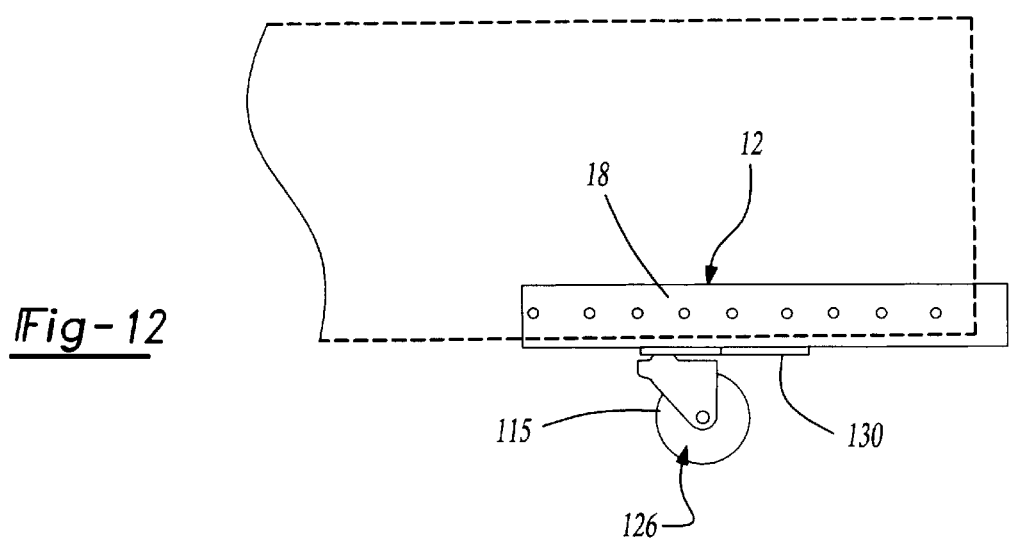
FIG. 12 is a partial side view of an alternative embodiment of the support wheel attachment assembly.

In an alternative embodiment, illustrated in FIGS. 11 and 12, the support wheel attachments 126 each have a caster wheel 115 connected to an attachment plate 130 that is attached to the bottom of the support plate 16.

Figure 6:
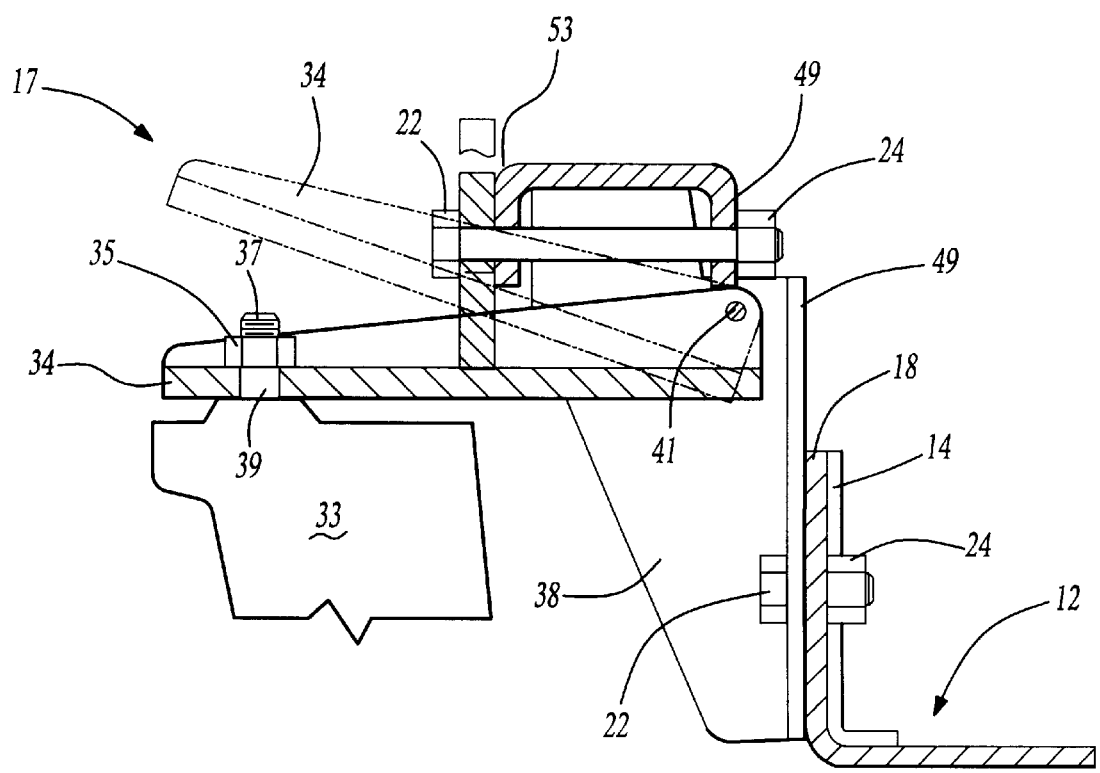
FIG. 6 is a cutaway view taken along lines 66 of FIG. 5.

The caster assembly 17 will be described with reference to FIGS. 1, 5, 6 and 8. As can be seen in FIG. 6, a bolt 22 and nut 24 bolts the caster assembly 17 to the side member 18 of corner member 12. The caster assembly 17 includes a caster wheel 32 mounted through a caster wheel bracket 33 to a pivoting plate 34. The caster wheel bracket 33 is attached by a nut 35 which threads onto bolt 37 and is received within an opening 39 in the pivoting plate 34. Plate 34 is pivotally connected to a first mounting bracket 38, which is mounted to the side member 18 and fixes the caster assembly 17 onto the side member 18. The pivoting plate 34 is connected to the first mounting bracket 38 through a pivot pin 41. Pivot pin 41 is received within openings 43 formed in the side walls 45 of first mounting bracket 38, see FIG. 8.

The mounting bolts 22 for mounting the caster assembly 17 to the side member 18 are received through openings 47 in the rear face 49 of the first mounting bracket 38. Additionally, there is a pair of openings 51 in the rear face 49 and front face 53 of first mounting bracket 38 for receipt of a bolt 22 to which nut 24 attaches. The nut 24 has an interference fit to keep it from coming loose. The bolt 22 supports a lifting mechanism 42 to control the movement of pivot plate 34 and the vertical movement of the mobile base 10.

Figure 7:
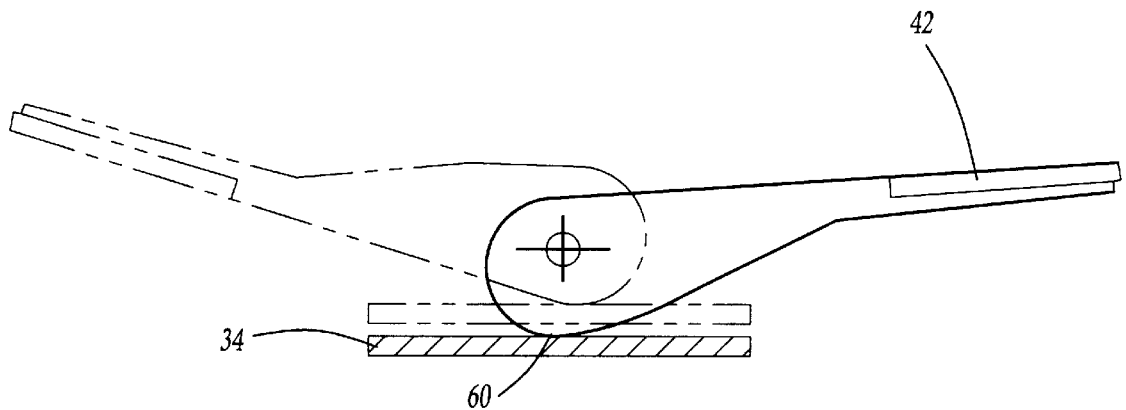
FIG. 7 is a view of the lifting mechanism portion of the caster wheel assembly.
Figure 8:
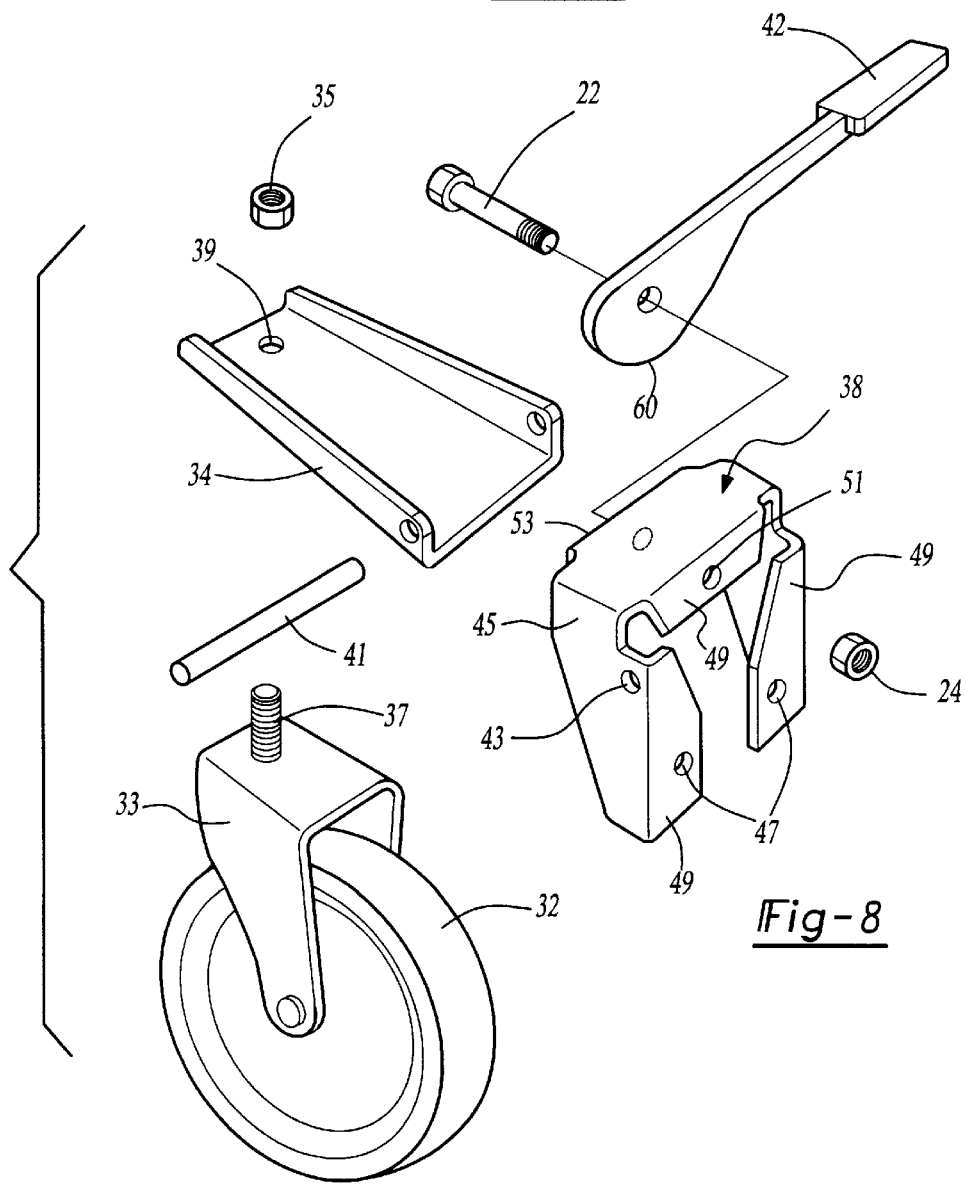
FIG. 8 is an exploded view of the caster wheel assembly.

As can be seen in FIG. 7, the lifting mechanism 42 has a cam surface 60 which engages pivot plate 34 and forces it downwardly with respect to the first mounting bracket 38 to raise the mobile base 10 with respect to the floor. When the lifting mechanism 42 is in the position shown by the solid lines in FIG. 7, the mobile base 10 is supported entirely by the caster wheels 32 and the support wheels 15 so that it can be easily moved about the shop floor. This movement of the mobile base 10 can be seen in FIGS. 3 and 4 and the movement of pivot plate 34 with respect to first mounting bracket 38 can be seen in FIG. 6. By flipping lifting mechanism 42 through approximately 120 degrees, the pivot plate 34 is pivoted upwardly with respect to first mounting bracket 38. This allows the mobile base 10 to lower with respect to the floor and be supported by stops 40.

Each stop 40 includes a second mounting bracket 46 having a flange 36 with an internally threaded hole, a threaded shaft 44 received within the internally threaded hole in the flange 36, and a foot member 42. The second mounting bracket 46 is mounted to the side member 18 by bolts 22 and nuts 24. The stops 40 can be adjusted by threading the shaft 44 with respect to the second mounting bracket 46 to ensure proper support of the mobile base 10 and to balance the base 10 and machinery.

Figure 9:
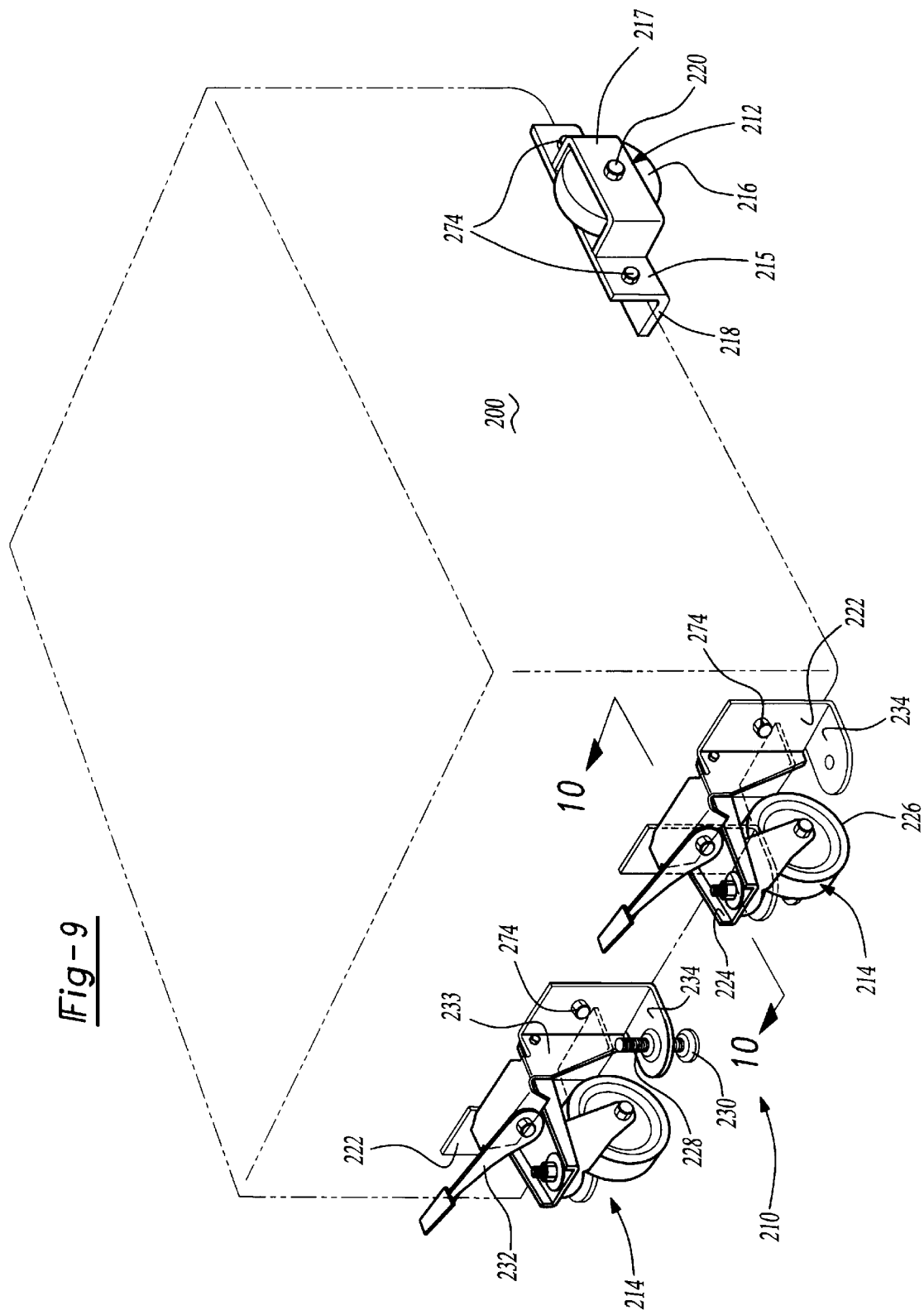
FIG. 9 is a perspective view of an alternative embodiment of the mobile base assembly of the present invention.
Figure 10:
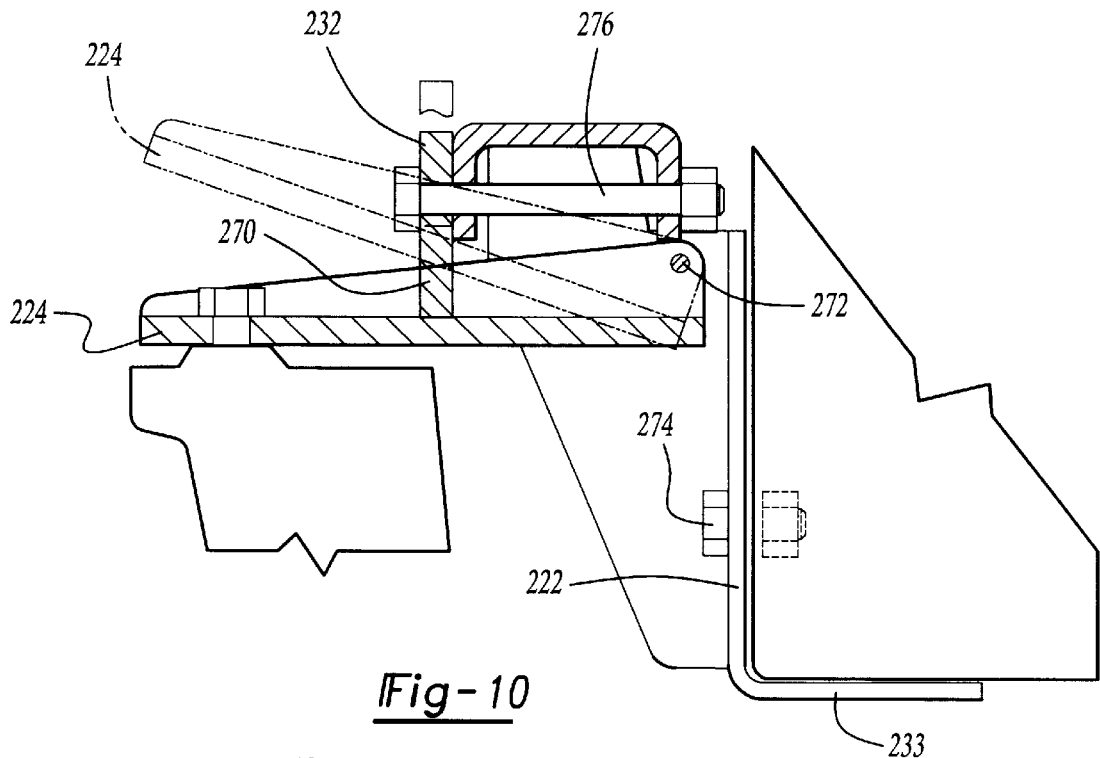
FIG. 10 is a cutaway view taken along lines 1010 of FIG. 9.

An alternative embodiment of the present invention of the mobile base assembly 210, illustrated in FIGS. 9 and 10, includes two support wheel attachments 212 (only one is illustrated) and two caster wheel assemblies 214 each attached directly to the machinery.

Each caster wheel assembly 214 has a mounting bracket 222, a pivot plate 224, a caster wheel 226, a threaded shaft 228, a foot member 230, and a lifting mechanism 232. The mounting bracket 222 has a support lip 233 that is positioned beneath the machinery to support a first portion of the machinery. See FIG. 10. The mounting bracket 222 also has a flange 234 with an internally threaded hole for receipt of the threaded shaft 228 of foot member 230. The mounting bracket 222 is directly connected to the machinery. The pivot plate 224 is pivotally connected to the mounting bracket 222. The caster wheel 226 is mounted to the pivot plate 224.

The threaded shaft 228 is received within the internally threaded hole in the flange 234 of the mounting bracket 222. The foot member 230 is attached to the threaded shaft 228 for supporting the machinery in a stationary position. As in the preferred embodiment, the foot members 230 can be adjusted by threading the shaft 228 with respect to the mounting bracket 222 to ensure proper support of the machinery and to balance the machinery.

The lifting mechanism 232 of this embodiment works the same as the lifting mechanism of the caster assembly 17 of the first embodiment. The lifting mechanism 232 is connected to the mounting bracket 222 and operatively engages the pivot plate 224. The lifting mechanism 232 has a cam surface 270 and is moveable from a first position to a second position, as illustrated in FIG. 10. The first position corresponds to the pivot plate 224 pivoting downwardly with respect to the mounting bracket 222 to raise the machinery. In this first position, the machinery is mobile. The second position corresponds to the pivot plate 224 pivoting upwardly with respect to the mounting bracket 222 to lower the machinery. In this second position, the machinery is stationary in position and rests on the foot members 230.

As in the previous embodiment, the pivot plate 224 is pivotally connected to the mounting bracket 222 by a pin 272. The mounting bracket 222 is preferably mounted directly to the machine 200 by bolts 274. In the disclosed embodiment, the lifting mechanism or lever 232 is mounted to the bracket 222 by a bolt 276 which allows the lever 232 to pivot with respect to the bracket 222.

The support wheel attachment 212 of this embodiment has an attachment member 215 that is preferably bolted to the machine 200, a wheel 216, and a wheel skirt 217. The attachment member 215 has a support lip 218 that is positioned beneath the machine for supporting the machinery. The wheel 216 is connected to the attachment member 215 by an axle 220 that allows the wheel 216 to freely rotate around the axle 220. The axle 220 is preferably a bolt. The wheel skirt 217 is welded to the attachment member 215 around the wheel 216.

Another embodiment of the support wheel attachment 126 has a corner member 12 for supporting a portion of the machinery, an attachment plate 130, and a caster wheel 115. The corner member 12 has a support plate 16 with a lower side and side members 18. The attachment plate 130 is connected to the lower side of the support plate 16. The caster wheel 115 is connected to the attachment plate 130.

It is important to note that the caster assemblies in all embodiments are stamped assemblies. Further, regarding the preferred embodiment, the corner members 12 and extension members 14 are stamped as well. In this way, there is virtually no welding of any portion of the universal base. Each piece is a stamped piece that is connected through bolts to an adjoining piece to form the overall mobile base 10. In this way, substantial labor savings are obtained because of the lack of welded joints in the mobile base 10. Further, the mobile base 10 is completely adjustable. By using various sizes of extension members 14 or in combining extension members 14, the base 10 can have a wide range of sizes to support just about any type of machinery used in a shop. Still further, the ability to bolt all pieces together makes this an easy do-it-yourself project and facilitates packaging and shipping since the various pieces can be packaged in much smaller packages than packages for custom welded mobile bases for shipping purposes.

Regarding the alternative embodiment, the mobile base 210 provides flexibility and reduced cost because the caster wheel assemblies 214 and the support wheel attachments 212 are connected directly to the machinery. As a result, packaging is even more convenient because extension members 14 are not included and shipping costs are reduced.

The invention has been described in an illustrative manner, and it is to be understood that the terminology that has been used is intended to be in the nature of words of description rather than of limitation.

Modifications and variations of the examples described above are possible and it must be understood that such changes may be within the scope of the following claims. In other words, the invention may be practiced otherwise than as specifically described above.

What is claimed is:

1. A mobile base assembly for movably supporting machinery, comprising:

support members having a support plate and side members, said side members having a plurality of holes;

extension members each having a first end and a second end and a plurality of holes which can be aligned with the holes in said side member for receipt of fasteners to fasten said extension members to said support members;

support wheels operatively connected to at least one of said support members for permitting movement of the machinery and for supporting the machinery;

at least one pivotal wheel assembly operatively connected to at least one of said support members which supports the machinery, said pivotal wheel assembly having a lifting mechanism for raising and lowering the machinery; and at least one stop for supporting the mobile base in a desired location when said at least one pivotal wheel assembly lowers the mobile base.

2. A mobile base assembly as set forth in claim 1, wherein said side members extend upwardly at a generally 90 degree angle to said support plate.

3. A mobile base assembly as set forth in claim 2, wherein said extension members are integral members having first and second sides generally perpendicular to one another, with one of said sides having a plurality of holes.

4. A mobile base assembly as set forth in claim 1, wherein said first end of each extension member is connected to one of either said side member of said support member or a second end of a second extension member.

5. A mobile base assembly as set forth in claim 1, wherein said support wheel attachment includes a wheel connected to said support member by an axle.

6. A mobile base assembly as set forth in claim 5, wherein said axle includes a bolt having a head and shaft and a nut threaded to said shaft to retain said wheel in place and allow said wheel to freely rotate around the bolt.

7. A mobile base assembly as set forth in claim 5, wherein a wheel skirt is welded to said side member about said wheel.

8. A mobile base assembly as set forth in claim 1, wherein said support wheel attachment comprises:

an attachment plate connected to said corner member; and a caster wheel connected to said attachment plate.

9. A mobile base assembly as set forth in claim 1, wherein said pivotal wheel assembly further comprises:

a first mounting bracket connected to said support member;

a pivot plate pivotally connected to said mounting bracket; and a caster wheel mounted to said pivot plate; wherein said lifting mechanism is connected to said mounting bracket and operatively engages said pivot plate.

10. A mobile base assembly as set forth in claim 9, wherein said lifting mechanism, has a cam surface and is adapted to pivot between first and second positions, wherein said first position corresponds to said pivot plate pivoting downwardly with respect to said mounting bracket to raise said mobile base so that said base can be rolled and said second position corresponds to said pivot plate pivoting upwardly with respect to said mounting bracket to lower said mobile base so that said base is stationary in position and cannot be rolled.

11. A mobile base assembly as set forth in claim 9, wherein said first mounting bracket is bolted to said side member of said support member by a bolt and nut;

said pivot plate is pivotally connected to said mounting bracket by a pivot pin;

said caster wheel is mounted to said pivot plate by a nut and bolt; and said lifting mechanism is connected to said mounting bracket and operatively engages said pivot plate to pivot said plate between a raised position and lowered position.

12. A mobile base assembly as set forth in claim 1, wherein said stop comprises:

a second mounting bracket having a flange with an internally threaded hole, said second mounting bracket being connected to said side member;

a threaded shaft received within said internally threaded hole in said flange of said second mounting bracket; and a foot member attached to said threaded shaft for supporting the mobile base unit in a stationary position.

13. A mobile base assembly for movably supporting a piece of machinery, comprising:

at least two wheel assemblies adapted to be operatively connected to a first portion of the machinery, said wheel assembly including an attachment member having a support lip adapted to be positioned beneath the machinery, wherein said attachment member is adapted to connect to the machinery, and at least one wheel connected to said attachment member by an axle; and at least one caster wheel assembly connected to a pivotal plate; said pivotal plate being connected to a mounting bracket for pivotal movement with respect to said bracket and a lifting mechanism connected to said pivotal plate, said bracket adapted to be operatively connected to a second portion of the machinery, wherein said caster wheel assembly is adapted for raising and lowering the machinery.

14. A mobile base assembly as set forth in claim 13, wherein said mounting backet includes a support lip adapted to be positioned beneath said machinery and at least one flange having an internally threaded hole;

a threaded shaft received within said internally threaded hole in said flange of said mounting bracket; and a foot member attached to said threaded shaft for supporting the machinery in a desired location.

15. A mobile base assembly as set forth in claim 14, wherein said lifting mechanism has a cam surface and is adapted to pivot between first and second positions, wherein said first position corresponds to said pivot plate pivoting downwardly with respect to said mounting bracket to raise the machinery so that the machinery can be rolled and said second position corresponds to said pivot plate pivoting upwardly with respect to the mounting bracket to lower the machinery so that the machinery is stationary in position and cannot be rolled.

16. A caster wheel assembly for movably supporting machinery, comprising:

a mounting bracket;

a pivot plate pivotally connected to said mounting bracket;

a caster wheel mounted to said pivot plate; and a lifting mechanism connected to said mounting bracket and operatively engaging said pivot plate; said lifting mechanism has a cam surface and is adapted to pivot between first and second position, wherein said first position corresponds to said pivot plate pivoting downwardly with respect to said mounting bracket to raise the machinery so that the machinery can be rolled and said second position corresponds to said pivot plate pivoting upwardly with respect to the bracket to lower the machinery so that the machinery is stationary in position and cannot be rolled.

17. A caster wheel assembly as set forth in claim 16, further comprising:

a flange having an internally threaded hole; and a stop, connected to said flange, for supporting the machinery in a desired location when said caster assembly lowers the machinery.

18. A caster wheel assembly as set forth in claim 17, wherein said stop comprises:

a threaded shaft received within said internally threaded hole in said flange; and a foot member attached to said threaded shaft for supporting the machinery in a stationary position.

19. A caster wheel assembly as set forth in claim 18, wherein said mounting bracket has a top surface, a first side flange and a second side flange each extending from said top surface and each having a hole wherein said holes are in alignment, a front flange having a hole extending from said top surface and a rear flange extending from said top surface having a hole that is aligned with said hole in said front flange;

a first rear projection extending from said first side flange and a second rear projection extending from said second side flange, wherein each of said projections has a hole;

said pivot plate has a lower section having a hole, a first extension having a hole extending from said lower section, and a second extension having a hole that is aligned with said hole in said first extension extending from said lower section; wherein said pivot plate is operatively connected to said mounting bracket by a pivot pin received within said holes in said first and second extensions of said pivot plate and said holes in said first and second side flanges of said mounting bracket.

20. A caster wheel assembly as set forth in claim 19, wherein said caster wheel is connected to a caster wheel bracket having a hole, said caster wheel bracket is connected to said pivot plate by a nut and a bolt received within said hole in said lower section of said pivot plate and said hole in said caster wheel bracket;

said lifting mechanism has a hole and is operatively connected to said wheel bracket;

said lifting mechanism has a hole and is operatively connected to said mounting bracket by a nut and a bolt received within said hole in said lifting mechanism and said holes in said front and rear flanges of said mounting bracket.

21. The mobile base assembly as set forth in claim 13, wherein said attachment member includes a support plate and side member; and a caster wheel operatively connected to said support plate.

* * * * *